Jan. 30, 1951 S. PRZYBOROWSKI 2,539,701
PRESSURE RESISTANT CELLULAR RADIATOR CORE
Filed April 4, 1947 2 Sheets-Sheet 1
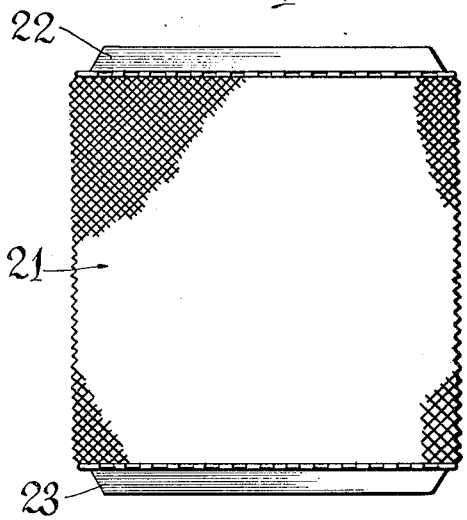
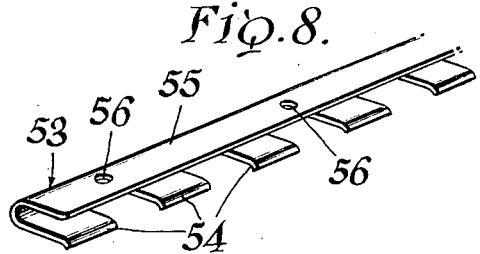
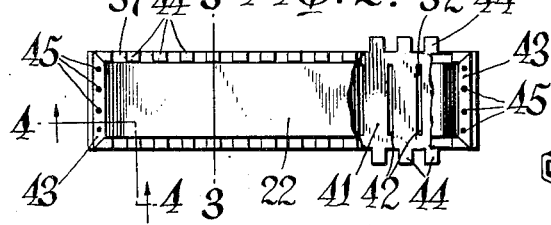
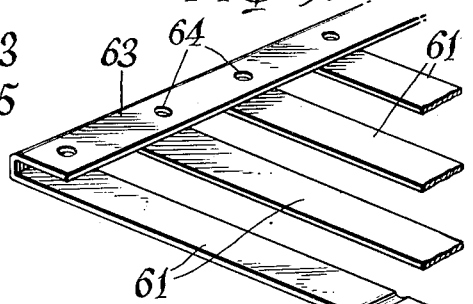
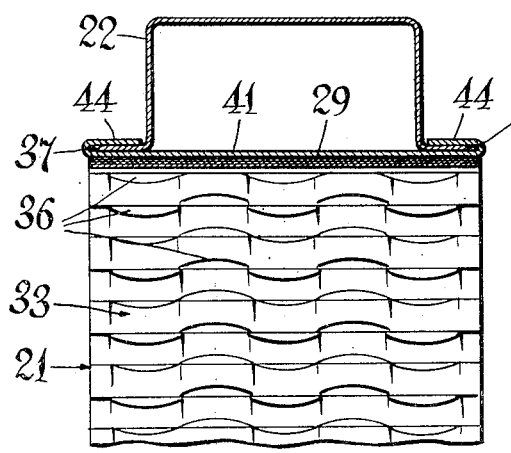
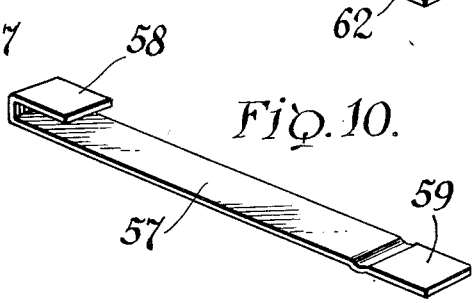
INVENTOR.
Stanislaus Przyborowski,
BY Albert R. Henry
ATTORNEY Jan. 30, 1951  S. PRZYBOROWSKI  2,539,701
PRESSURE RESISTANT CELLULAR RADIATOR CORE
Filed April 4, 1947  2 Sheets-Sheet 2
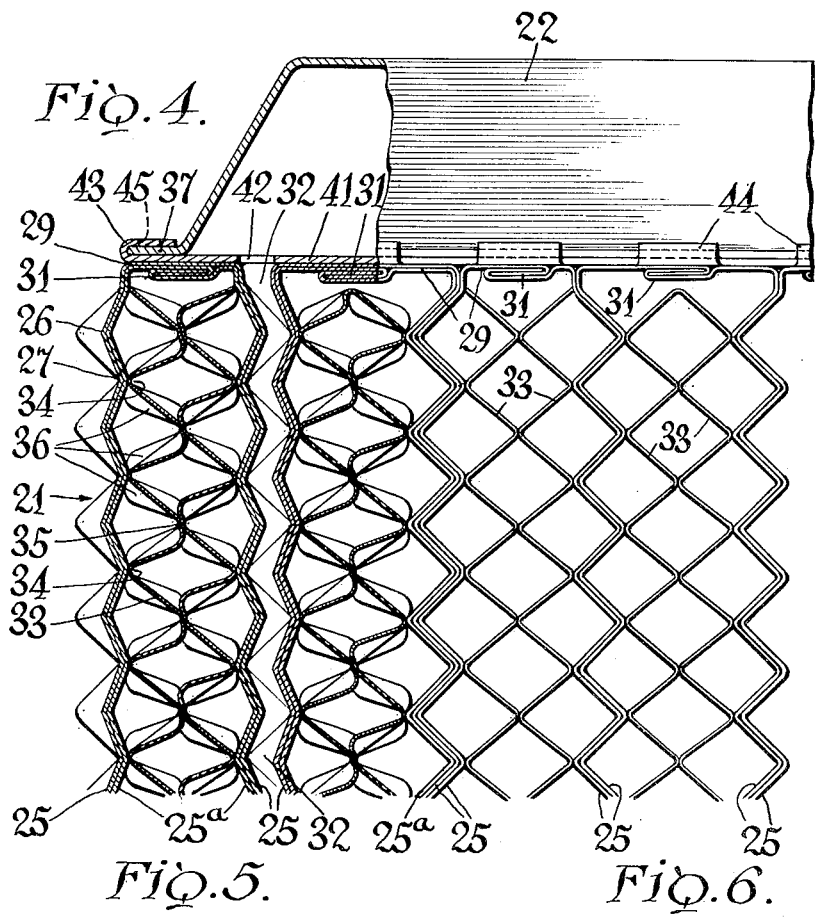
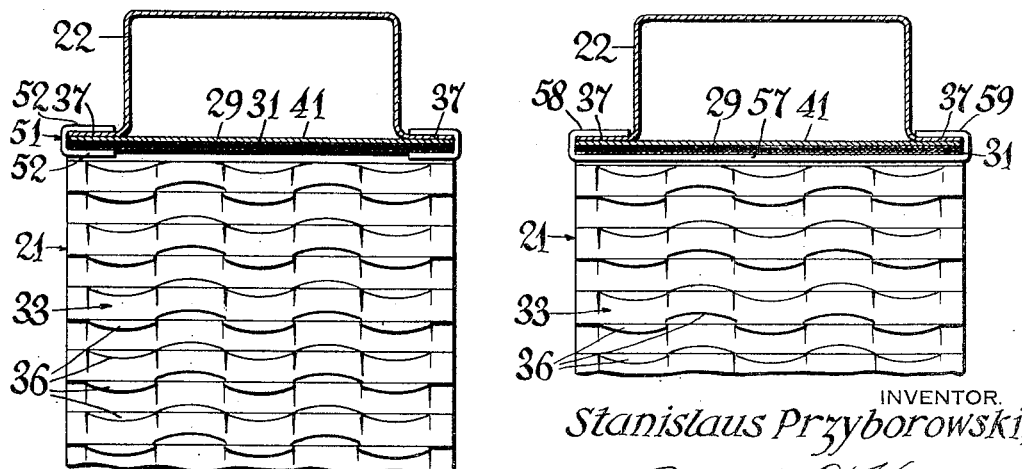
INVENTOR.
Stanislaus Przyborowski,
BY Albert R. Henry
ATTORNEY Patented Jan. 30, 1951

2,539,701

UNITED STATES PATENT OFFICE 2,539,701

PRESSURE RESISTANT CELLULAR RADIATOR CORE

Stanislaus Przyborowski, Kenmore, N. Y.

Application April 4, 1947, Serial No. 739,491

2 Claims. (Cl. 257—130)

This invention relates to cellular radiators, and it has particular reference to the provision of a cellular type of core assembly which is capable of withstanding repeated applications of high internal pressures.

As is well understood, cellular radiators, such as those used in conjunction with automobile engines, are composed of ribbon units, soldered together along their marginal portions to define water passages, together with interposed ribbon units providing a plurality of transverse air passages, and top and bottom water tanks for directing the water in its flow through the core. As a means of increasing the cooling capacity and decreasing the cost, the metallic ribbons of which the core is formed are made very thin. A fairly high static structural strength is imparted to the core, however, by corrugating or deforming the ribbons, and bonding them into a unitary assembly by the solder. Difficulties have been experienced, nevertheless, with the dynamic strength of the core, which frequently has an unsatisfactorily low value, as shown by separation along the joints.

Previously, it has been considered that dynamic failures were primarily caused by vibratory stresses resulting from the motion of the automobile, coupled, on occasion, with a low quality of the solder or an unsatisfactory grain structure of the metal. Insofar as vibrations have been a basic cause, I have heretofore proposed effective means for meeting such condition, as reflected, for example, by my prior Patents No. 2,066,279, December 29, 1936; and No. 2,073,588, March 9, 1937. However, it was again observed in more recent years that an undesirable number of cores showed failure by the opening up of the joints between the water passages and between the core ends and the header tanks. Some of these failures along the water passages occurred along the sides, a number of others were found in the central portion of the core, and failures along the tank joints could not easily be classified as to location. Analyses of the solder, metal, and manufacturing procedure did not lead to a solution of the new problem.

I have now discovered that these types of failures are not so much due to vibratory stresses (referring, of course, to failures in cores incorporating the patented improvements) as they are to a repetitious pulsating of the metal parts. This pulsation, or tendency to pulsate, is due to a variation in the hydraulic pressure of the liqiud in the radiator, and the failures just referred to become more frequent when that pressure exceeds a certain normal value. For example, the usual American automotive practice has been to design the engine cooling system to operate at atmospheric pressure, or, at the most, at a few pounds above. In such systems, the sudden acceleration of the engine, and with it the speeding up of the water pump, does not produce an internal pressure in the radiator of any destructive magnitude. Accordingly, a radiator which could pass a twelve pound test pressure before installation has been accepted as a good serviceable unit, and under these conditions vibratory forces are more significant as sources of potential failure.

When, however, more powerful water pumps are employed, or when the cooling system is designed to operate at a pressure system developing a normal internal pressure of from five to ten or more pounds, the tendency of the conventional cellular core to fail becomes quite pronounced. This, of course, is unsatisfactory from the viewpoint of continuous operation, and it is also unsafe with regard to small radiators used for passenger compartment comfort heating. Despite the static strength of the core, which is more than sufficient to withstand high external pressure loads, the repeated impacts of liquid under pressure appear to set up a condition of pushes and pulls on the metal, as if to impart to the elements an accordion-like action. In actual magnitude, such pulsations or movements are not discernible to the naked eye, but their highly probable existence is reflected by the sudden separation of the margins of two connected water line ribbons, or by the opening up of the joint along a tank margin, thus leading to failure.

According to the present invention, means are provided to overcome the effects of the pulsations under higher pressures, thereby substantially eliminating failures due to such cause, and moreover making cellular cores generally applicable to pressure cooling systems. These results are obtained wthout unduly increasing the weight and cost of the radiator, or detracting from its thermal effectiveness.

According to one aspect of the invention, the end tanks for the radiator, instead of merely being soldered to the ribbon elements along the tank margin, are so integrated with the ribbons that hydraulic forces, tending to separate the tanks from the ribbons, also tend to elongate the ribbons, and thereby overcome side thrusts tending to separate the ribbons from each other. Such integrating means may take the form of clips, fingers, or plates of sheet metal which interconnect the tanks and ribbon assembly.

According to another aspect of the invention, the end ribbons for the core are reinforced throughout their extent, so as to provide strong beam members which can resist flexing over the entire end areas of the core, thereby precluding the setting up of actual pulsating movements tending to open the core joints.

Typical embodiments of the invention are illustrated in the accompanying drawings, wherein:

Fig. 1 is a front elevation of a typical radiator of the cellular type, which may be used in automotive cooling;

Fig. 2 is a top plan of the core, portions being broken away to show more clearly one mode of utilizing the invention;

Fig. 3 is an enlarged section taken on the line 3—3 of Fig. 2;

Fig. 4 is a greatly enlarged view taken substantially on the line 4—4 of Fig. 2;

Figs. 5 and 6 are sections, similar to that of Fig. 3, each showing a modified form of connection between the tank and ribbon assembly; and, Figs. 7 to 10 are perspectives of various forms of connectors which may be employed according to the showings of Figs. 5 and 6.

The radiator shown in Figs. 1 to 4 inclusive is basically of the well known automotive cellular type, comprising a core section 21 and upper and lower tanks or headers 22 and 23. The tanks are suitably equipped with fittings—not shown—by means of which water or other cooling liquid may be circulated, as is well understood in the art. The liquid flows from one tank to the other, passing through spaced water passages, while air flows from the front to the back of the core in a transverse direction, thereby to cool the liquid.

As best shown in the enlarged view of Fig. 4, the core 21 is commonly formed of sets of deformed or corrugated ribbon elements, which are frequently referred to as "outers" and "inners," because of the manufacturing and fabricating process. These ribbons may be, insofar as the principles of this invention are concerned, of the same type as are shown and described in my aforesaid Patent No. 2,073,588. The "outer" ribbon comprises a length of metal 25, such as brass, which is corrugated along its length to provide crest and trough portions 26 and 27 respectively, and marginal offset portions 28. Such ribbon is folded into a closed band having flat portions 29 at each end, where the ribbon may be crimped and flattened on itself to provide joints 31. Such a band has impervious surfaces, and, when two of the "outers" are positioned alongside of each other, the offset marginal portions contact throughout their lengths, while the intermediate portions are spaced to provide a passageway or water leg 32.

The "inner" element consists of a length of copper ribbon 33, also corrugated into a generally zig-zag configuration, and which may, if desired, be used in single width or in double fold, as specifically illustrated. The ribbon 33 is also provided with crest and trough portions 34 and 35 respectively, and with alternately disposed or facing bumps or protuberances 36. When folded upon itself, the crests and troughs align with each other to provide transversely extending contact areas, delimiting transverse air passages through which air may flow from one face of the core to the other. Upon insertion of the "inner" into the "outer" band, the crests of the "inner" mate with the troughs 27 of the "outer," thereby spacing the opposite walls of each such band 25.

In usual practice, a number of "inner" and "outer" subassemblies are fabricated, and then are laid alongside of each other to provide a core assembly of such size as may be required. While held in a clamping frame, the assembly is then face dipped into a bath of molten solder, which flows by capillary attraction along the transverse lines of contact, and into the joints defined by abutting marginal portions 28. The core is thus integrated into a unitary whole, to form a cellular structure of high static strength having a plurality of water legs 32 extending from end to end, and a large number of transverse air passages extending from face to face between the water legs 32. Heat from the water is transferred by conduction into the spacing ribbon 33, and thence to the air flowing through the core.

The end tanks 22 and 23 are soldered to the core ends by means of flanges 37 which engage the end marginal portions. It will, of course, be readily apparent that the area of contact between the tank flange and the core margin is a relatively small percentage of the total end area of the core. Nevertheless, in prior art practice with low hydraulic pressures, it has been adequate to overcome too many radiator failures at this region.

As thus far described, emphasis has been laid on the general nature and mode of manufacture of known radiator cores of the cellular type. Reference will now be made to the novel means of increasing the bond between the tanks and core ends, and which, as it has been found, greatly increases the dynamic strength of the radiator to meet high internal pressure conditions.

Referring first to Figs. 1 to 4, it will be seen that each end of the core 21 is provided with a plate 41, formed with parallel slots 42, each of which is adapted to register with the end of a water leg 32 when the plate is positioned on the core end. The plate 41 is also provided with end flanges 43, which may be continuous, and with a plurality of side flanges 44, which may be interrupted to define a plurality of tabs or fingers. These flanges are so dimensioned as to project beyond the margins of the core when the flanges are in the plane of the plate 41.

In assembly, the core is fabricated and integrated as hereinabove described, and a plate 41 is then laid over each end, with the slots 42 aligned with the water legs 32, and the flanges extending beyond the edges of the core. The plate is then firmly soldered to the core end by any suitable method, such, for example, as first coating the surface of the plate with solder and applying heat to the upper surface, or by providing apertures in the plate between the slots 42 to admit molten solder to the under surface. Thereafter, the tank 22 or 23 is positioned on the plate 41, and its flange 37 is soldered to the plate, rather than directly to the ends of the core ribbons. The flanges 43 and 44 are then bent up and over the outer surface of the flange 37, and solder is again applied to secure these parts together. As indicated in Fig. 2, the solder may be admitted between the flanges by providing access apertures 45.

With this construction, it will be seen that the forces tending to separate the tank from the core end have been so neutralized that, for all pressures within the strength limits of the materials themselves, they can no longer exert their destructive effects. Thus, referring still to the construction shown in Figs. 3 and 4, an upward hydraulic or internal force, tending to lift the tank 22 from the end of the core 21, is also a downward force pressing the plate 41 more firmly upon the core end, inasmuch as it is a fundamental principle that a fluid pressure acts in all directions. Similarly, the pressure seeking to force the tank flange and plate 41 apart in a lateral direction is resisted by the flanges 43 and tabs 44.

Referring primarily to Fig. 4, it will be noted that the two outside sub-assemblies of "inners" and "outers" are shown as being provided with a double thickness of water line ribbon, as indicated by the reference numeral 25a. It should be pointed out that, while Fig. 4 is of course a fragmentary view, the construction is the same for both tanks or core ends, and the added ribbon 25a is continuous, the same as the main ribbon 25. Herein the side wall structure differs from that specifically shown in my prior Patent No. 2,073,588, wherein provision was made for comparatively short added ribbons at the ends of the band. It was pointed out in that patent that, for overcoming vibratory forces, no advantage had been found for a continuous ribbon along the side walls, sufficient to offset the added cost and weight.

I have now discovered, however, that a continuous double thickness of ribbon, particularly in the water line ribbon or "outer," is of material benefit when dealing with the problem of high internal hydraulic pressures. It is not possible for me here to attempt an involved scientific explanation. As a practical matter, however, it seems that when the water legs 32 are impacted with fluid under relatively high pressure, there is set up a sideways motion in the several truss-like or beam-like members which constitute the sub-assemblies of the core. These beams are, of course, anchored to the tanks at each end, and their flexure there is therefore probably less than at the central longitudinal portions. A kind of sideways thrust is therefore created, which, strangely enough, may cause a face joint to fail along the end portions, or the side portions, or even in the middle portion.

Whatever may be the ultimate explanation for the result, I have found, in practice, that by using double "outers" for the first two or three sub-assemblies from each side, and by making them continuous, the noted failures have been overcome. This has been demonstrated by accelerated destruction tests, wherein cores have been subjected to a pulsating hydraulic pressure having a peak of thirty pounds per square inch gauge at a frequency of approximately seven and one-half cycles per minute. Under such conditions, prior art or conventional cellular radiators may fail at less than one thousand cycles, while such a radiator withstanding fifty thousand cycles is exceptional. When employing the laminated ribbon construction shown in Fig. 4, the radiator life was increased to between 100,000 to 140,000 cycles; and when incorporating the connector structure of Figs. 3 and 4, the radiators withstood the pressure impacts for over 200,000 cycles before revealing imminent failure. Such internal pressure conditions exceed those met with in the industry, and are, in fact, sufficient to cause a permanent bowing or deformation of the tank metal. It will accordingly be seen that the present invention fulfils its intended purpose.

Satisfactory results for slightly lower pressures may be obtained by the forms of tank connectors shown in Figs. 7 to 10, and which are adapted to be positioned as illustrated in Figs. 5 and 6. In Fig. 7, there is shown a small sheet metal clip 51 having flanges 52, which, as shown in Fig. 5, are adapted to be slipped over the top of the tank flange 37 and under the joint 31 of the end fold 29 of the outer ribbon 25. These are soldered in place in the manner heretofore described. In service, upward thrusts on the inside of the tank 22 or 23 are transmitted, through the clips, to the under side of the water line ribbons 25, and hence the ribbons and tank tend to move together, rather than apart from each other, as in prior art constructions.

Another form is shown in Fig. 8, wherein a continuous clip 53 is formed with a series of spaced flanges 54, adapted to fit under the end folds 29, and a top flange 55 adapted to engage along the length of the flange 37 of the tank. Apertures 56 are formed in the flange 55 at intervals, so that solder may flow more freely into the joint. A better securing of the tank flange to the core end is thereby obtained.

In Fig. 10 there is shown a connector having a length 57 equal to the depth of the core 21, which is provided with a bent-over flange section 58 at one end and a bendable tab 59 at the other. As shown in Fig. 6, the tanks are connected to the core 21 in the usual manner, and the connectors of Fig. 10 are then pushed under the folds 29 until the flange 58 overlaps the adjacent flange 37. The projecting tabs 59 are then bent over to overlap the opposite flange 37, and the parts are secured by soldering. As compared to Fig. 7, these connectors transmit the internal pressure over a greater area of the end fold 29.

The form shown in Fig. 9 is similar to that of Fig. 10, in that it comprises a series of lengths 61 formed with foldable tabs 62 at one end, but at the opposite end the flange section 63 is made continuous, and is provided with the soldering apertures 64. Its similarity in this respect to the form shown in Fig. 8 will be immediately apparent.

Other forms and variations will suggest themselves to those skilled in the art in view of the foregoing examples. It will be seen that, in each, high internal pressures, which would quickly disrupt the tank joints of ordinary cellular radiators, are neutralized or balanced by a means, in the form of a plate, strip, or clip, which minimizes the effect of such pressures on the joint between the core and its headers. It has also been found that such means, whether used alone or in conjunction with the continuous side wall reinforcing shown in Fig. 4, moreover increases the resistance of the core element joints to separation under such hydraulic forces. Obviously, such means also add to the resistance to mechanical or vibratory stresses, and thus also incorporate the advantages which I have heretofore presented to the art.

While the invention has been described with respect to certain embodiments, it is not intended that the invention should be so strictly construed as to be limited thereto, but it is intended that it should be considered as having a scope commensurate with that expressed in the following claims.

I claim:

1. A cellular radiator comprising a plurality of superimposed pairs of impervious ribbons abutting each other at their marginal portions and spaced therebetween to provide water passages, said ribbons being jointed at their ends to adjacent ribbons of adjacent pairs to provide substantially planar end portions, generally zig-zag heat conducting ribbons interposed between adjacent jointed water passage ribbons and abutting the same to define transverse air passages, said ribbons forming a cellular radiator core, said ribbons being bonded to each other by solder along the abutting marginal portions and the faces of said core, said water passage ribbons adjacent the sides of the core being laminated with additional water passage ribbons throughout their entire length between said end portions, end tanks secured to the opposite ends of the core to cover the open ends of the water passages, said tanks being formed with outwardly extending marginal flanges overlying the marginal end portions of the core, and connector members between the ends of the core and said tanks, said connector members having one portion directly bonded to the water passage ribbons at the ends thereof between said water passages and at said planar end portions, and another portion overlapping and bonded to the outer marginal flanges of said tanks.

2. A cellular radiator comprising a plurality of superimposed pairs of impervious ribbons abutting each other at their marginal portions and spaced therebetween to provide water passages, said ribbons being jointed at their ends to adjacent ribbons of adjacent pairs to provide substantially planar end portions, generally zig-zag heat conducting ribbons interposed between adjacent water passage ribbons and abutting the same along the lines of reverse bending thereof to define transverse air passages, said ribbons forming a cellular radiator core, said ribbons being bonded to each other by solder along the abutting marginal portions and the faces of the core, outwardly flanged header tanks positioned on the ends of the core and having opposed flanges overlying the marginal portions of said ribbons, and flanged connectors having outer portions overlapping and bonded to the outer surfaces of said opposed tank flanges and intermediate portions connecting said outer portions and passing under the ends of the jointed ends of the water passage ribbons from face to face of the core and bonded thereto.

STANISLAUS PRZYBOROWSKI.

REFERENCES CITED

The following references are of record in the file of this patent:

UNITED STATES PATENTS

| Number | Name | Date |
|---|---|---|
| 1,730,719 | Briskin | Oct. 8, 1929 |
| 1,743,785 | Leszckyk | Jan. 14, 1930 |
| 1,905,447 | Diamant | Apr. 25, 1933 |
| 2,073,588 | Przyborowski | Mar. 9, 1937 |
| 2,164,005 | Booth | June 27, 1939 |

FOREIGN PATENTS

| Number | Country | Date |
|---|---|---|
| 8,906 | Great Britain | Apr. 13, 1910 |
| 17,063 | Great Britain | July 22, 1929 |
| 568,296 | Great Britain | Mar. 28, 1945 |
| 426,604 | France | May 7, 1910 |